United States Patent [19]

Kondo

[11] 4,044,370  
[45] Aug. 23, 1977

[54] PHOTOGRAPHIC CAMERA WITH DENSITY-VARIABLE FILTER

[75] Inventor: Toshihiro Kondo, Chofu, Tokyo, Japan

[73] Assignees: Toshihiro Kondo, Chofu; Fuji Photo Film Co., Ltd., both of Japan

[21] Appl. No.: 599,342

[22] Filed: July 28, 1975

[30] Foreign Application Priority Data

July 29, 1974 Japan .................................. 49-86714

[51] Int. Cl.² ............................................. G03B 17/00
[52] U.S. Cl. ..................................... 354/289; 354/57; 354/59; 354/295
[58] Field of Search ....................... 354/22, 23, 42, 53, 354/57, 58, 59, 61, 289, 295

[56] References Cited

U.S. PATENT DOCUMENTS

| 2,418,370 | 4/1947 | Simmon ................................. 354/22 |
| 3,270,639 | 9/1966 | Windsor ................................ 354/22 |
| 3,732,793 | 5/1973 | Tagu ..................................... 354/295 |
| 3,785,265 | 1/1974 | Landeau ........................... 354/295 X |

FOREIGN PATENT DOCUMENTS 698,573  10/1953  United Kingdom .................... 354/42

*Primary Examiner*—John Gonzales  
*Attorney, Agent, or Firm*—Gerald J. Ferguson, Jr.; Joseph J. Baker

[57] ABSTRACT

A density-variable optical filter is mounted on a camera so that the density of the filter may be freely selected by manual operation independently of the aperture size of a diaphragm and the shutter speed. In a preferred embodiment, a rotatable ring for controlling the density of the density-variable filter graduated with a scale of one unit system is mounted to the lens barrel of the taking lens of the camera and an exposure meter which has a needle swingable in the field of view of a view finder graduated with a scale of the same unit system as that of the rotatable ring for controlling the filter density is provided to indicate the scene brightness. In another embodiment, a diaphragm control ring, a shutter speed setting dial and a film sensitivity setting dial are connected with the exposure meter to input the exposure information regarding the aperture size, shutter speed and film sensitivity into the exposure meter so that the needle of the exposure meter may indicate the desirable density of the filter to result normal exposure.

7 Claims, 5 Drawing Figures

PHOTOGRAPHIC CAMERA WITH DENSITY-VARIABLE FILTER

BACKGROUND OF THE INVENTION

1. Field of the Invention

This invention relates to a photographic camera, and more particularly to a photographic camera having a density-variable optical filter for controlling exposure. The photographic camera in accordance with this invention is capable of controlling the exposure by varying the density of the optical filter as well as by changing the shutter speed or the aperture size of a diaphragm.

2. Description of the Prior Art

In the conventional photographic camera, either the aperture size of a diaphragm or the shutter speed is freely selected in advance and the remaining adjustment is made manually or automatically to take a picture of normal exposure. In addition to this ordinary type of photographic camera, it has also been known in the art to select a combination of the aperture size and the shutter speed from a group of predetermined combinations thereof in accordance with the scene brightness. In this type of camera, the combination is usually automatically selected from the group.

In these conventional photographic cameras, only two variables, i.e., the aperture size and the shutter speed, are used to control the exposure. The film sensitivity is of course introduced into the consideration of the exposure control in advance. Therefore, if one of the two variables is selected in advance, the other is automatically determined in accordance with the scene brightness to obtain a photograph of normal exposure.

However, in the photographic technique, the aperture size has an important role in addition to that of exposure control, namely, that of determining the focal depth. Further, the shutter speed has also an important role in determining the degree of blur. Therefore, a large aperture size or a slow shutter speed is sometimes employed intentionally to obtain a medium sharp or a somewhat blurred photograph. Thus, it is desirable to be able to freely select both the aperture size and the shutter speed to obtain a photograph of desirable sharpness and blur.

It has been known in the art to use an optical filter in a photographic camera in which either the aperture size of a diaphragm or the shutter speed is freely selected and the remaining one of these is controlled to obtain a picture of normal exposure. Such an optical filter has been used for the purpose of correcting over-exposure when the scene brightness is too high. For instance, when the picture is taken at a place where the ultra-violet rays are strong such as near the sea or in the mountain, an ultra-violet ray absorbing filter or a neutral density filter is employed. These filters are only used for the purpose of correcting over-exposure, and accordingly, it is impossible to freely select the aperture size and the shutter speed even if the filter is used.

Further, it has also been known in the art to provide a density-variable filter in a camera for the purpose of obtaininglarge F-numbers such as 32, 45, 90 and so on over the limit of the aperture size. One example of such a camera with a density-variable optical filter is disclosed in U.S. Pat. No. 3,732,793, in which a polarization filter ring graduated with said large F-numbers is rotatably mounted on a camera to attenuate the light incident upon the film therein by rotation thereof in combination with another polarization filter mounted on the camera. This density-variable filter, however, is regarded as a part of the diaphragm to enlarge the range of the aperture size thereof. Therefore, in this camera with a variable-density filter also, it is impossible to freely select both the shutter speed and the aperture size as desired. This camera is also, therefore, classified as a two-variable type camera.

SUMMARY OF THE INVENTION

In view of the above mentioned defects of the conventional photographic cameras of the two-variable type, the primary object of the present invention is to provide a photographic camera of three-variable type having a density-variable filter in which both the aperture size and the shutter speed can be freely selected and the density of the filter can be manually varied as desired independently of the aperture size and the shutter speed to obtain a picture of normal exposure.

Another object of the present invention is to provide a photographic camera of three-variable type having a density-variable filter wherein a scene brightness measuring and indicating means which indicates the scene brightness in terms of a filter density number to which the density-variable filter is to be controlled.

The above objects are accomplished by providing a density-variable optical filter in the optical path of the taking lens of a camera. Preferably, the density-variable optical filter is mounted on the lens barrel of the taking lens of the camera and the density of the filter is varied by rotating a rotatable ring or the like which is manually operable.

In the three-variable camera in accordance with the present invention, it is of course possible to use the camera as a two-variable camera by fixing one of the three variables, for instance by setting the filter at maximum transmittance.

As the density-variable optical filter, there can be used any of various kinds of optical filters which can be varied in density or transmittivity. For example, there may be used a pair of polarization filters one of which is rotatable with respect to the other, a pair of optical pattern plates one of which is rotated or moved with respect to the other to vary or change the total amount of light passing therethrough (as described in detail hereinafter), or a liquid density filter the thickness of which can be varied to vary the transmittivity thereof. Filters such as those mentioned above whose density or light transmittivity is variable will hereinafter be referred to as "density-variable optical filters" or simply as "variable filters."

In the present invention, it should be noted that the sensitivity of the film used must be considerably high in comparison with that of the film used in conventional photographic cameras, since the quantity of incident light is attenuated by the variable filter. In practical use, the sensitivity of the film used in this invention should preferably be over ASA3000. As an example of such a high-sensitivity film which is commercially available, there can be mentioned "TYPE 410" made by Polaroid Corporation and having a sensitivity of ASA10000.

DESCRIPTION OF THE PREFERRED EMBODIMENTS

Figure 1:
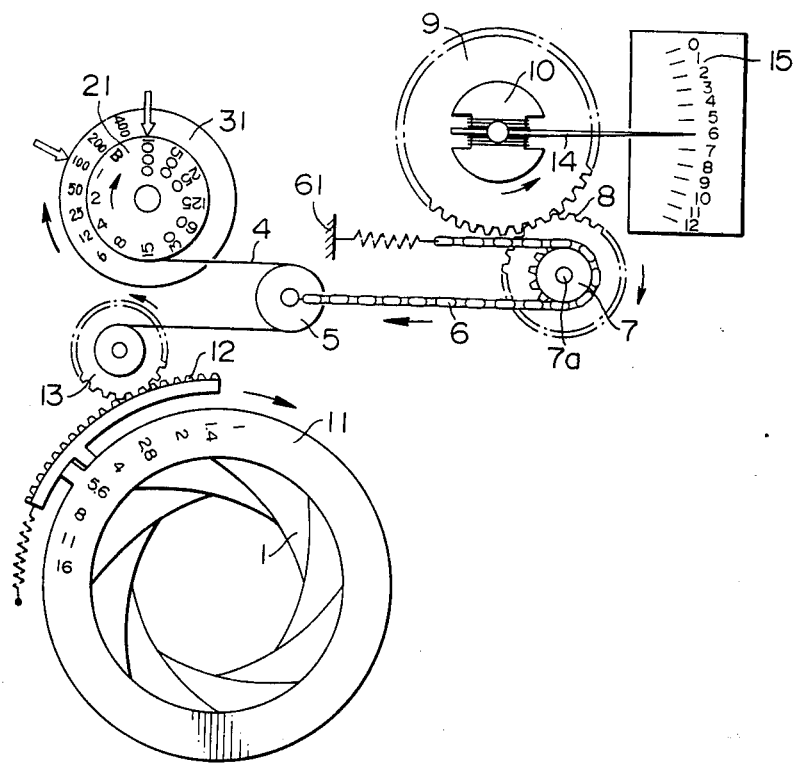
FIG. 1 is an explanatory view showing an example of an interconnecting mechanism for interconnecting an exposure meter with exposure information input means.

The photographic camera in accordance with the present invention is provided with a density-variable optical filter in the optical path of the taking lens thereof. The density of the variable filter is capable of being manually controlled independently of the aperture size of a diaphragm and the shutter speed in accordance with the scene brightness. In order to facilitate the control of the three variables in combination with each other, the unit system of the three variables is converted to a common unit system which is also capable of indicating the scene brightness. This unit should preferably be suchthat the three variables indicated in terms of the unit are simply added or subtracted so that the optimum exposure control can be effected by making the total of the three variables in terms of the unit equal to the scene brightness indicated in terms of the same unit. In a preferred embodiment of the invention, a diaphragm control ring, a shutter speed setting ring and a filter ring are graduated in the same unit so that the three variables can easily be added and subtracted with each other.

By using the same unit system for the three variablesand for the film sensitivity and the scene brightness determined as shown in Table I, the density of the density-variable filter can be determined by subtracting the sum of the aperture size and the shutter speed from the sum of the film sensitivity and the scene brightness as represented by the following formula, $$FV = (BV + SV) - (AV + TV),$$

where $FV$ is the density of the variable filter, $BV$ is the scene brightness, $SV$ is the film sensitivity, $AV$ is the aperture size and $TV$ is the shutter speed.

TABLE I

| Common Unit (No.) | Filter Density (FV) Transmittivity | Scene Brightness (BV) in LV | Film Sensitivity (SV) in ASA | Aperture Size (AV) F-number | Shutter Speed (TV) sec. |
|---|---|---|---|---|---|
| 0 | 1 | 0 | 3 | 1 | 1 |
| 1 | 1/2 | 1 | 6 | 1.4 | 1/2 |
| 2 | 1/4 | 2 | 12 | 2 | 1/4 |
| 3 | 1/8 | 3 | 25 | 2.8 | 1/8 |
| 4 | 1/15 | 4 | 50 | 4 | 1/15 |
| 5 | 1/30 | 5 | 100 | 5.6 | 1/30 |
| 6 | 1/60 | 6 | 200 | 8 | 1/60 |
| 7 | 1/125 | 7 | 400 | 11 | 1/125 |
| 8 | 1/250 | 8 | 800 | 16 | 1/250 |
| 9 | 1/500 | 9 | 1600 | 22 | 1/500 |
| 10 | 1/1000 | 10 | 3200 | 32 | 1/1000 |
| 11 | 1/2000 | 11 | 6400 | 45 | 1/2000 |
| 12 | 1/4000 | 12 | 13000 | 64 | 1/4000 |

Since the scene brightness can be represented by the position of a needle of an exposure meter, the normal exposure can be obtained by setting a filter operating member at a position to make the filter density (FV) equal to the difference between the sum of the aperture size (AV) and the shutter speed (TV), and the sum of the scene brightness (BV) indicated by the exposure meter in a view finder and the film sensitivity (SV). In order that the aperture size (AV) and the shutter speed (TV) may be readily observed by the photographer on the camera body, the scales indicating this information in terms of the common unit are preferably provided on the control rings for controlling these factors where they can be easily seen at a glance.

For example, when the film sensitivity is ASA100 ($SV=5$) and the scene brightness is Light Value 15($BV=15$), the density (transmittivity) of the filter represented in terms of said unit is determined by subtracting the sum of the aperture size (AV) and the shutter speed (TV) from the sum of the film sensitivity ($SV=10$) and the scene brightness ($BV=15$), i.e., $5+15=20$. Therefore, if the aperture size is selected to be F:11 ($AV=7$) and the shutter speed is selected to be 1/250 sec. ($TV=8$), the density of the filter required to effect the optimum exposure becomes $5+15-(7+8)=5$, which indicates that normal exposure can be obtained by setting the filter ring at 5 which effects a transmittivity of 1/30.

In the camera in accordance with the present invention, it is desirable that the scene brightness be indicated by an exposure meter which indicates the scene brightness in terms of said unit. Further, in order to facilitate the addition of the film sensitivity (SV) to the scene brightness (BV), the film sensitivity is desirably indicated in terms of the same unit together with the scene brightness (BV). More preferably, a film sensitivity setting means is connected with the exposure meter so that the information regarding the film sensitivity is put into the exposure meter and the exposure meter indicates the sum of the scene brightness (BV) and the film sensitivity (SV).

Furthermore, it is also possible to perform a calculation to subtract the sum of the aperture size and the shutter speed (AV+TV) from the sum of the scene brightness and the film sensitivity (BV+SV) by use of an electric calculating circuit and indicate the difference in a view finder. In this case, the indicated difference itself corresponds to the density of the filter represented in terms of the unit number. Thus, the manual setting of the density-variable filter is considerably facilitated.

Further, it is also possible to put information regarding the density of the filter (FV) in an exposure meter in which the other four kinds of information (BV+SV−AV−TV) are put so that the normal exposure may be obtained by controlling the density of the variable filter so as to cause a needle of the exposure meter visible through the view finder to coincide with a stationary mark provided in the field view of the view finder.

A preferred embodiment of the present invention is schematically illustrated in FIG. 1, in which the information on the aperture size and the shutter speed is put into an exposure meter so as to cause it to indicate in terms of said unit the density to which the filter is to be manually controlled.

Referring to FIG. 1, a diaphragm setting ring 11 for varying the aperture size of a diaphragm 1 is associated with an arcuate rack 12 which is meshed with a pinion 13. A shutter speed setting dial 21 and a film sensitivity setting dial 31 are concentrically provided to be independently rotated. Both dials 21 and 31 and said pinion 13 are engaged with a wire 4 which is tensioned around a movable pulley 5 so that the rotation of said dials 21 and 31 and said pinion 13 cause movement of the pulley 5. The movable pulley 5 is engaged with one end of a chain 6 which is fixed to a stationary wall 61 at the other end thereof and is tensioned around a sproket wheel 7 rotatably mounted to a fixed shaft 7a. The sproket 7 is concentrically fixed to a spur gear 8 for input of exposure information which is in turn meshed with a large gear 9 fixed to an exposure meter 10. Thus, the movement of said movable pulley 5 is converted into the rotation of the large gear 9. The exposure meter 10 has a needle 14 which swings across a filter scale 15 provided in one part of the field viewed through the view finder. When the diaphragm 1 is stopped down, the shutter speed setting dial 21 is rotated in the direction of higher speed or the film sensitivity setting dial 31 is rotated in the direction of lower film sensitivity, the movable pulley 5 is moved to the left and the gear 7 is rotated clockwise and the exposure meter 10 is rotated counterclockwise to move the needle 14 in the direction of the zero end of scale 15 indicating that the density variable filter must be set at higher transmittivity to obtain a normal exposure.

Figure 2:
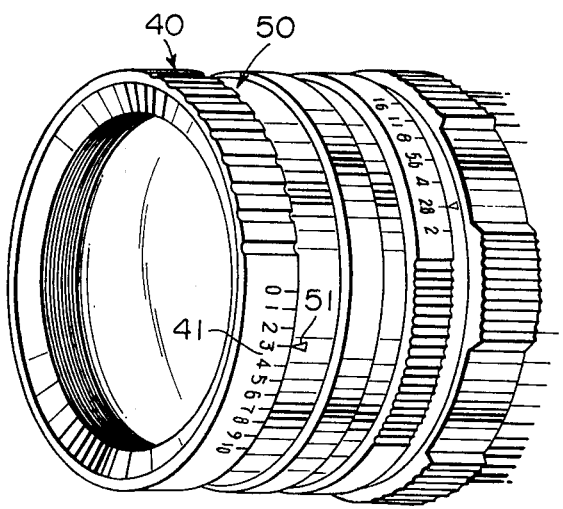
FIG. 2 is a perspective view of an example of a density-variable filter employed in a photographic camera in accordance with this invention.

The density-variable filter is composed of, for instance, a fixed polarization filter and a rotatable polarization filter which varies the transmittivity of the filter combination by the rotation thereof. The rotatable filter is graduated with a scale which indicates the position of the rotatable filter wherein zero indicates maximum transmittivity (or that there is no filtration effect) and larger numbers indicate lower transmittivity as shown in Table I. FIG. 2 shows an example of filter controlling rings, in which a rotatable filter control ring 40 to which a rotatable polarization filter is fixed is provided with a scale 41 to be adjusted with a mark 51 fixed to a stationary filter frame 50 to which another polarization filter is fixed.

In operation of the above described embodiment of the present invention, the film sensitivity setting dial 31 is rotated to input the film sensitivity information and the diaphragm control ring 11 is rotated to select a desirable aperture size and the shutter speed setting dial 21 is rotated to select a desirable shutter speed. Thus, three factors of exposure are put into the exposure meter 10 and the scene brightness, in which the three factors are taken into account, is indicated by the needle 14 on the scale 15.

The value indicated by the needle 14 thus corresponds to the difference obtained by subtracting the sum of the aperture size (AV) and the shutter speed (TV) from the sum of the scene brightness (BV) and the film sensitivity (SV) and is the value to which the density of the filter must be set to obtain a normal exposure. Therefore, the photographer need merely adjust the scale 41 of the rotatable filter ring 40 to align with the mark 51 of the fixed filter frame 50 the density number on the scale 41 which corresponds to the number indicated by the needle 14 on the scale 15.

Figure 3:
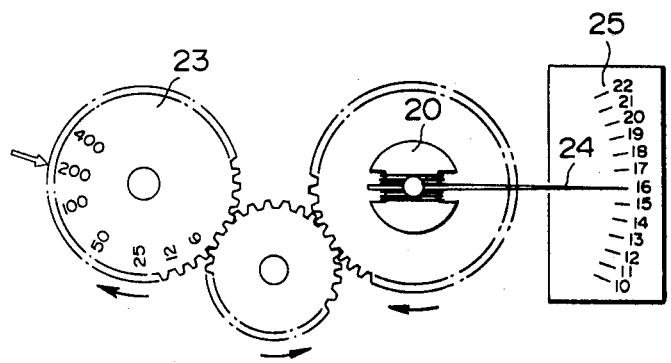
FIG. 3 is a plan view showing an example of a film sensitivity input means provided in the camera in accordance with this invention.
Figure 4:
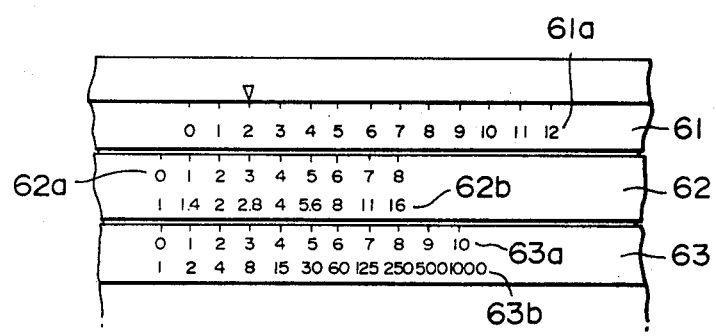
FIG. 4 is a fragmentary developed view showing the scales graduated on controlling rings for the density-variable filter, diaphragm and shutter speed employed in the camera of the present invention.

Although in the above described embodiment of the invention the desirable density of the filter is automatically indicated in the view finder, three exposure factors, for example, aperture size, shutter speed and filter density, may be manually selected with reference to the indication of a needle on the scale of an exposure meter. In this case, as shown in FIG. 3, only film sensitivity information is put into the exposure meter 20 in advance by a film sensitivity dial 23 and the other three factors are manually selected by rotating control rings 61, 62 and 63 as shown in FIG. 4 with reference to indication of a needle 24 on the scale 25 the exposure meter 20. Since the sum of the film sensitivity (SV) and the scene brightness (BV) is indicated by the needle 14, the control rings 61, 62 and 63 are rotated to make the sum of the threefactors (FV+AV+TV) equal to said sum of the film sensitivity (SV) and the scene brightness (BV). Referring to FIG. 4, a filter control ring 61 is provided with a scale 61a representing filter density (FV), a diaphragm control ring 62 is provided with a scale 62a representing the aperture size (AV) and a shutter speed setting ring 63 is provided with a scale 63a representing the shutter speed (TV). The above scales 61a, 62a and 63a are all in said common unit system. The diaphragm control ring 62 and the shutter speed setting ring 63 are further provided with scales 62b and 63b graduated with aperture sizes and shutter speeds in their usual form. These rings 61, 62 and 63 are rotated to make the sum of the numbers of the three scales 61a, 62a and 63a in alignment with an alignment mark equal to the number indicated by the needle 24 of the exposure meter 20. In the example as shown in FIG. 4, the sum of the three factors is 2+3+3=8. Now, if the diaphragm control ring 62 is rotated to set the aperture size at F:5.6 (AV=5) and the shutter speed setting ring 63 is rotated to set the shutter speed at 1/250 sec. (TV=8), the sum becomes 6+8=13. Therefore, if the needle 24 of the exposure meter 20 indicates 16 on the scale 15, the filter controlling ring 61 is rotated to set the number 3 (16−13=3) to obtain a picture of normal exposure.

Figure 5:
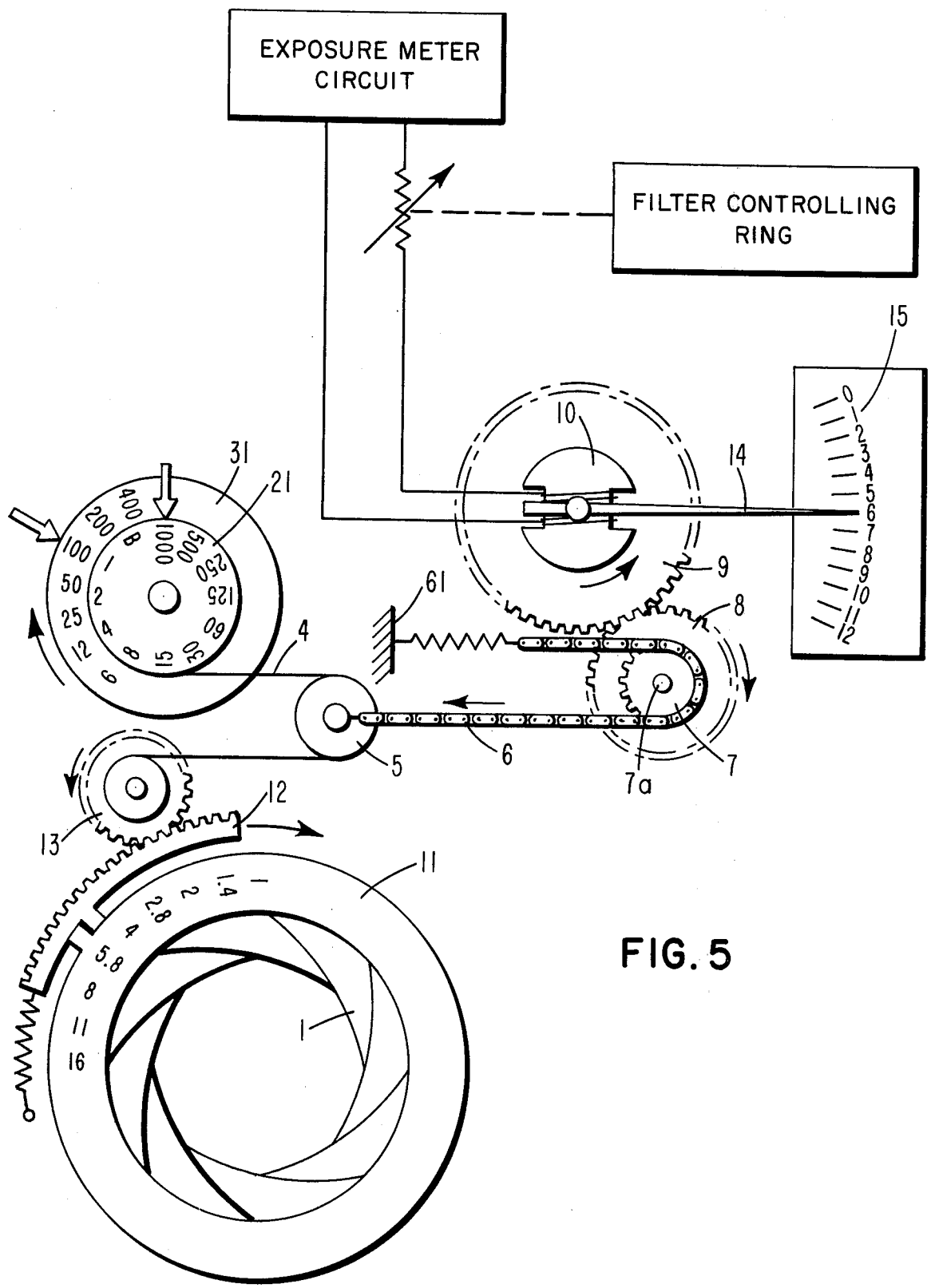
FIG. 5 is an explanatory view showing another example of an interconnecting mechanism for interconnecting an exposure meter with exposure information input means, wherein a filter controlling ring is connected with the exposure meter to put the filter density information therein.

Further, in said first embodiment of the invention as shown in FIG. 1, a filter controlling ring as shown in FIG. 5 may be connected with the exposure meter 10 to put the filter density information therein by inserting a variable resistor which represents the density of the filter into a circuit of the exposure meter. By putting the filter information into the exposure meter 10, all four exposure factors are incorporated in the exposure meter 10. Therefore, the need 14 of the exposure meter 10 indicates the scene brightness itself taking said four factors into consideration. In this case, a zero point mark is provided in the view finder in the range of swing of the needle 14 so that the desirable filter density may be obtained by rotating the filter controlling ring to adjust the needle 14 with the zero point mark. In this case, other rings than the filter controlling ring can be rotated to adjust the needle 14 with the mark. Therefore, any one of the three variables can be finally selected by manual operation.

I claim:

1. A photographic camera comprising a diaphragm the aperture size of which is freely selectable by manual operation, a shutter means the shutter speed of which is freely selectable by manual operation, and a density-variable optical filter means the density of which is freely selectable by manual operation independently of said diaphragm and shutter means, said filter means comprising a manual control member which is manually operated to vary the density of the filter, and an optical filter the density of which is varied by operation of said manual control member, said manual control member being graduated with a scale which indicates the density of the filter and an exposure meter which indicates the scene brightness in the same unit system as that of said scale graduated on the manual control member.

2. A photographic camera as claimed in claim 1 wherein said exposure meter is connected with a diaphragm control means and said diaphragm and said shutter means to take the aperture size and the shutter speed into account.

3. A photographic camera as claimed in claim 1 wherein said exposure meter is connected with a film sensitivity setting means so that the film sensitivity may be taken into consideration.

4. A photographic camera as claimed in claim 1 wherein said exposure meter has a needle to indicate the scene brightness which needle is made swingable in the field of view of a view finder of the camera.

5. A photographic camera comprising a diaphragm the aperture size of which is freely selectable by manual operation, a shutter means the shutter speed of which is freely selectable by manual operation, and a density-variable optical filter means the density of which is freely selectable by manual operation independently of said diaphragm and shutter means, said filter means comprising a manual control member which is manually operated to vary the density of the filter, and an optical filter the density of which is varied by operation of said manual control member, said manual control member being a rotatable ring mounted on a lens barrel of the taking lens of the camera and being graduated with a scale which indicates the density of the filter, and a diaphragm control ring and a shutter speed setting ring rotatably mounted on the lens barrel in side by side relationship with said rotatable ring for manual control of the variable filter, said diaphragm control ring and said shutter speed setting ring being provided with a scale of the same unit system as that of the rotatable ring for the variable filter.

6. A photographic camera as claimed in claim 5 wherein said diaphragm control ring and said shutter speed setting ring are further graduated with numerals which indicate the aperture size in F-numbers and the shutter speed in seconds, respectively.

7. A photographic camera comprising a diaphragm the aperture size of which is freely selectable by manual operation, a shutter means the shutter speed of which is freely selectable by manual operation, and a density-variable optical filter means the density of which is freely selectable by manual operation independently of said diaphragm and shutter means and an exposure meter which has a needle swingable in the field of view of the view finder of the camera and a film sensitivity setting means, wherein said film sensitivity setting means said diaphragm, shutter means, and said optical filter means are connected with the exposure meter to input the film sensitivity of the film loaded in the camera, the manually selected aperture size, the manually selected shutter speed, and the density of the filter means into said exposure meter whereby the needle indicates the scene brighness measured thereby taking said film sensitivity, aperture size, shutter speed, annd density of the filter into account.

* * * * *